United States Patent
Emori et al.

(10) Patent No.: US 8,831,943 B2
(45) Date of Patent: Sep. 9, 2014

(54) LANGUAGE MODEL LEARNING SYSTEM, LANGUAGE MODEL LEARNING METHOD, AND LANGUAGE MODEL LEARNING PROGRAM

(75) Inventors: Tadashi Emori, Tokyo (JP); Yoshifumi Onishi, Tokyo (JP)

(73) Assignee: NEC Corporation, Tokyo (JP)

( * ) Notice: Subject to any disclaimer, the term of this patent is extended or adjusted under 35 U.S.C. 154(b) by 1344 days.

(21) Appl. No.: 12/302,962

(22) PCT Filed: May 30, 2007

(86) PCT No.: PCT/JP2007/061023
§ 371 (c)(1),
(2), (4) Date: Dec. 1, 2008

(87) PCT Pub. No.: WO2007/142102
PCT Pub. Date: Dec. 13, 2007

(65) Prior Publication Data
US 2010/0063819 A1 Mar. 11, 2010

(30) Foreign Application Priority Data
May 31, 2006 (JP) .................................. 2006-150962

(51) Int. Cl.
| | |
|---|---|
| G10L 15/04 | (2013.01) |
| G10L 15/06 | (2013.01) |
| G10L 15/00 | (2013.01) |
| G10L 15/197 | (2013.01) |
| G10L 15/183 | (2013.01) |

(52) U.S. Cl.
CPC ............. *G10L 15/197* (2013.01); *G10L 15/183* (2013.01)
USPC ............................ 704/251; 704/255; 704/257

(58) Field of Classification Search
USPC .................... 704/231–257, E15.001–E15.05, 704/E11.001–E11.007
See application file for complete search history.

(56) References Cited

U.S. PATENT DOCUMENTS

| | | | | |
|---|---|---|---|---|
| 5,293,584 | A | * | 3/1994 | Brown et al. .................. 704/277 |
| 5,606,644 | A | * | 2/1997 | Chou et al. ..................... 704/243 |

(Continued)

FOREIGN PATENT DOCUMENTS

| | | |
|---|---|---|
| JP | 10-198395 | 7/1998 |
| JP | 10-240288 | 9/1998 |

(Continued)

OTHER PUBLICATIONS

Klakow et al., "Testing the correlation of word error rate and perplexity." Journal of Speec Communication. vol. 38, Issue 1. Sep. 2002. pp. 19-28.*

(Continued)

*Primary Examiner* — Pierre-Louis Desir
*Assistant Examiner* — David Kovacek
(74) *Attorney, Agent, or Firm* — Young & Thompson (57) ABSTRACT

A language model learning system for learning a language model on an identifiable basis relating to a word error rate used in speech recognition. The language model learning system (10) includes a recognizing device (101) for recognizing an input speech by using a sound model and a language model and outputting the recognized word sequence as the recognition result, a reliability degree computing device (103) for computing the degree of reliability of the word sequence, and a language model parameter updating device (104) for updating the parameters of the language model by using the degree of reliability. The language model parameter updating device updates the parameters of the language model to heighten the degree of reliability of the word sequence the computed degree of reliability of which is low when the recognizing device recognizes by using the updated language model and the reliability degree computing device computes the degree of reliability.

9 Claims, 6 Drawing Sheets

(56) References Cited

U.S. PATENT DOCUMENTS

| | | | |
|---|---|---|---|
| 5,864,810 A * | 1/1999 | Digalakis et al. | 704/255 |
| 5,999,902 A * | 12/1999 | Scahill et al. | 704/240 |
| 6,078,885 A * | 6/2000 | Beutnagel | 704/258 |
| 6,081,779 A * | 6/2000 | Besling et al. | 704/257 |
| 6,092,045 A * | 7/2000 | Stubley et al. | 704/254 |
| 6,157,912 A | 12/2000 | Kneser et al. | |
| 6,167,377 A * | 12/2000 | Gillick et al. | 704/240 |
| 6,385,579 B1 * | 5/2002 | Padmanabhan et al. | 704/243 |
| 6,539,353 B1 * | 3/2003 | Jiang et al. | 704/254 |
| 6,754,626 B2 * | 6/2004 | Epstein | 704/235 |
| 6,789,061 B1 * | 9/2004 | Fischer et al. | 704/240 |
| 6,823,307 B1 | 11/2004 | Steinbiss et al. | |
| 6,865,531 B1 * | 3/2005 | Huang | 704/226 |
| 6,904,402 B1 * | 6/2005 | Wang et al. | 704/10 |
| 6,925,154 B2 * | 8/2005 | Gao et al. | 379/88.03 |
| 6,959,276 B2 * | 10/2005 | Droppo et al. | 704/226 |
| 7,043,422 B2 * | 5/2006 | Gao et al. | 704/9 |
| 7,191,130 B1 * | 3/2007 | Leggetter et al. | 704/254 |
| 7,219,055 B2 * | 5/2007 | Lucke | 704/234 |
| 7,219,058 B1 * | 5/2007 | Rose et al. | 704/238 |
| 7,251,600 B2 * | 7/2007 | Ju et al. | 704/257 |
| 7,603,267 B2 * | 10/2009 | Wang et al. | 704/9 |
| 7,912,707 B2 * | 3/2011 | Yu et al. | 704/10 |
| 2001/0051868 A1 * | 12/2001 | Witschel | 704/9 |
| 2002/0165714 A1 * | 11/2002 | Beyerlein | 704/243 |
| 2002/0173953 A1 * | 11/2002 | Frey et al. | 704/226 |
| 2003/0055655 A1 * | 3/2003 | Suominen | 704/276 |
| 2004/0059576 A1 * | 3/2004 | Lucke | 704/256 |
| 2004/0064315 A1 * | 4/2004 | Deisher et al. | 704/233 |
| 2004/0098263 A1 * | 5/2004 | Hwang et al. | 704/266 |
| 2005/0171761 A1 * | 8/2005 | Ju et al. | 704/10 |
| 2006/0058999 A1 * | 3/2006 | Barker et al. | 704/256 |
| 2007/0055508 A1 * | 3/2007 | Zhao et al. | 704/226 |
| 2007/0233487 A1 * | 10/2007 | Cohen et al. | 704/255 |
| 2008/0004875 A1 * | 1/2008 | Chengalvarayan et al. | 704/234 |
| 2008/0147400 A1 * | 6/2008 | Yu et al. | 704/251 |
| 2008/0255844 A1 * | 10/2008 | Wu | 704/255 |
| 2008/0270129 A1 * | 10/2008 | Colibro et al. | 704/236 |
| 2010/0063819 A1 * | 3/2010 | Emori | 704/251 |

FOREIGN PATENT DOCUMENTS

| | | |
|---|---|---|
| JP | 2000-75886 | 3/2000 |
| JP | 2000-75892 | 3/2000 |
| JP | 2000-259173 | 9/2000 |
| JP | 2000-356997 | 12/2000 |
| JP | 2001-109491 | 4/2001 |
| JP | 2002-91477 | 3/2002 |
| JP | 2002-533771 | 10/2002 |
| WO | 2006/034152 | 3/2006 |

OTHER PUBLICATIONS

European Search Report—EP 07 74 4435—Feb. 8, 2012.

Sudoh K et al: "Post-dialogue confidence scoring for unsupervised statistical language model training", Speech Communication, Elsevier Science Publishers, Amsterdam, NL. vol. 45, No. 4, Apr. 1, 2005. pp. 387-400, XP025258485, ISSN: 0167-6393, DOI: 10.1016/J.SPECOM. Oct. 17, 2004 [retrieved on Apr. 1, 2005].

Sherif Abdou et al: "Dynamic Tuning of Language Model Score in Speech Recognition Using a Confidence Measure", ICSLP 2002: 7th International Conference on Spoken Language Processing. Denver, Colorado, Sep. 16-20, 2002; [International Conference on Spoken Language Processing. (ICSLP)], Adelaide: Casual Productions, AU, Sep. 16, 2002, p. 397, XP007011651, ISBN: 978-1-876346-40-9.

"Language and Computation 4: Probabilistic Language Model", K. Kita, University of Tokyo Press 1999.

HTK book for HTK Version 3.3 by Young et al., Published Apr. 2005.

Frank Wessel et al., Confidence Measures for Large Vocabulary Continuous Speech Recognition, IEEE Trans. on Speech and Audio Processing. vol. 9, No. 3, Mar. 2001.

"MMIE training of large vocabulary recognition systems" Speech Communication vol. 22, pp. 303-314, 1997, V. Veltchev et al.

* cited by examiner

LANGUAGE MODEL LEARNING SYSTEM, LANGUAGE MODEL LEARNING METHOD, AND LANGUAGE MODEL LEARNING PROGRAM

CROSS REFERENCE TO RELATED APPLICATION

This application is based upon and claims the benefit of priority from Japanese patent application No. 2006-150962, filed on May 31, 2006, the disclosure of which is incorporated herein in its entirety by reference.

TECHNICAL FIELD

The present invention relates to a language model learning system, a language model learning method, and a language model learning program used in speech recognition. More specifically, the present invention relates to a language model learning system, a language model learning method, and a language model learning program, which are capable of building a language model of higher accuracy than a conventional method since the present invention executes learning of a language model by using discriminative bases, and are capable of building a speech recognition system of higher accuracy by utilizing the language model of the higher accuracy for the speech recognition system.

BACKGROUND ART

A language model learning method using a conventional technique will be described.

In the conventional language model learning method, the language model is expressed with N-gram model as depicted in pp. 57-62 of Non-Patent Document 1, for example. In the N-gram model, the appearance probability of a word string configured with N-number of words is approximated by the probability of appearing the N-th word after a word string of (N−1)-number of words as a history. Provided that the word string is configured with a single and a plurality words or a character string of smaller than a word, the N-gram model can be computed with the maximum likelihood estimation when there is a learning corpus that is mass-capacity text data.

Figure 6:
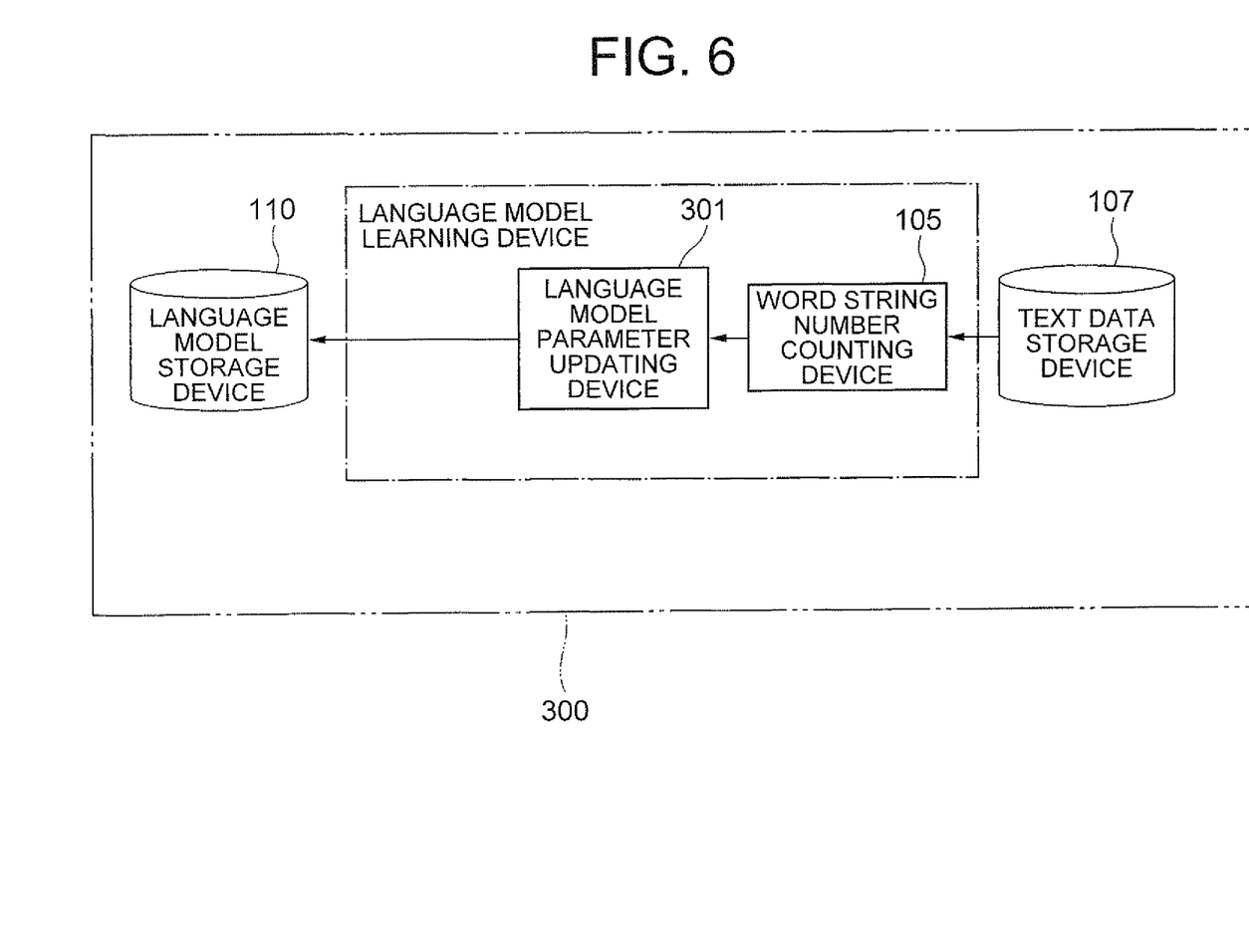
FIG. 6 is a block diagram showing a language model learning system formed with a conventional technique.

FIG. 6 shows a structure of the language model learning device system that is formed with such conventional technique. According to FIG. 6, the conventional language model learning system is configured with a text data storage device 107, a word string number counting device 105, a language model parameter updating device 301, and a language model storage device 110.

The word string number counting device 105 extracts all word strings configured with N-number of words from text data that is the learning corpus stored in the text data storage device 107, and computes the appearance number by each type of the word strings. For example, regarding a word string "of the" in which two words "of" and "the" are linked, the word string number counting device 105 computes how many times the word string "of the" appears in the text data.

The language model parameter updating device 301 computes the appearance probability of the word string by dividing the appearance number of the target word string by the number of all word strings. That is, the appearance number of the word string "of the" corresponds to the value that is obtained by dividing the appearance number of the word string "of the" by the total number of the two-word chains. In the cases of speech recognition, the conditional probability is used in a process of decoding. Provided that the probability of appearing "the" after "of" is "P(the|of)" and the joint probability of appearing the word string "of the" is "P(of, the)", for example, it can be computed as "P(the|of)=P(of, the)/P(of)" by using the Bayes' theorem. Note here that "P(of)" means the probability of appearing the word "of".

Non-Patent Document 1: "Language and Computation 4: Probabilistic Language Model", Kenji KITA, University of Tokyo Press, 1999

SUMMARY OF THE INVENTION

A first issue regarding the conventional language model learning system is that it may not be able to obtain highly reliable recognition results even when speech recognition is conducted based on the language model that is learned by the conventional method, since the most likelihood estimation that is the conventional language model learning method takes no consideration over a word error rate and the like which are used as evaluation scales for the speech recognition.

A second issue is that it is not possible to achieve optimization simultaneously or successively while considering the influences of both a sound model and a language model, since the most likelihood estimation that is the conventional language model learning method takes no consideration over the influence of the sound model when learning the language model.

An object of the present invention is to make it possible to perform learning of a language model with discriminative bases that are related to a word error rate and the like which are used as the evaluation scales of the speech recognition. Further, another object of the present invention is to build a sound model and a language model for achieving highly accurate speech recognition through executing learning of the sound model and the language model with standardized discriminative bases, and conduct learning of the sound model and the language model by considering the recognition performance of the sound model at the time of learning the language model while considering the performance of the language model at the time of learning the sound model.

A language model learning system according to the present invention includes: a language model storage device for storing a language model used for speech recognition; a recognizing device which performs speech recognition on learning speech data stored in advance by using the language model stored in the language model storage device, and outputs a recognition result; a reliability degree computing device for computing reliability degrees of respective word strings in the recognition result; and the language model parameter updating device which updates a parameter of the language model stored in the language model storage device based on the reliability degrees of the respective word strings computed by the reliability degree computing device.

With such language model learning system, the language parameter updating device executes learning of the language model by updating the parameter of the language model according to the discriminative bases that are related to the bases that are used for the evaluation of the speech recognition so as to execute learning of the language model. Therefore, it is possible to build the language model of high reliability, thereby enabling highly accurate speech recognition.

With the above-described language model learning system it is possible to build a highly reliable language model by using, as the reliability degrees of the respective word strings computed by the reliability degree computing device, one of or a combination of posteriori probability of the respective word strings computed from the recognition result, a signalto-noise ratio of a speech signal of the corresponding word strings, and a ratio of continuous time to expected continuous time of the corresponding word strings as the reliability degrees of the corresponding word strings.

The language model learning system may include a word string number counting device which computes number of all the word strings within the learning text data corresponding to the learning speech data and computes appearing number of the respective word strings, wherein the language model parameter updating device may compute appearance frequencies of the respective words from the number of all the word strings computed by the word string number counting device and the appearing number of the respective word strings, and update the parameter of the language model stored in the language model storage device based on the appearance frequencies of the respective word strings and the reliability degrees of the respective word strings computed by the reliability degree computing device.

Further, when the reliability degree computed by the reliability degree computing device is not the maximum value, the language model parameter updating device may correct the appearance frequency of the corresponding word string to a large value, and may update the parameter of the language model stored in the language model storage device based on the corrected appearance frequency. Furthermore, provided that the appearing number of the word string $\omega_j$ in the learning text data is $N_j$, a total number of word strings having the same word number as $\omega_j$ contained in the learning text data is R, the reliability degree of the word string $\omega_j$ when observation time series $O_r$ is observed in the recognition result is $p(\omega_j|O_r)$, a constant is D, and the value of the language model before update is $p_j$, the language model parameter updating device may compute parameter $p_j$ of the language model corresponding to the word string $\omega_j$ according to Expression 1 and update the parameter to a computed value.

$$P_j = \frac{N_j - \sum_r p(\omega_j | O_r) + D p_j}{R - \sum_j \sum_r p(\omega_j | O_r) + D} \quad \text{[Expression 1]}$$

$\sum_r$ : Sum of learning speech data numbers $\sum_j$ : Sum of all word strings The language model learning system may further include a sound model learning device which uses the learning speech data, an initial sound model, and the language model to update the sound model. With this, the sound model learning device and the language model parameter updating device learn the sound model and the language model, respectively, with the standardized discriminative bases. Therefore, it is possible to optimize both the sound model and the language model simultaneously. Further, the sound model learning device may update the sound model by using a mutual information amount basis.

A language model learning method according to the present invention includes: a recognizing step which performs speech recognition on learning speech data by using a language model stored in advance, and outputs a recognition result; a reliability degree computing step for computing reliability degrees of respective word strings in the recognition result; and a language model parameter updating step which updates a parameter of the language model based on the reliability degrees of the respective word strings in the recognition result. Further, the language model parameter updating step may update the parameter of the language model in such a manner that the reliability degrees of the respective word strings in the recognition result become the maximum.

Like the language model learning system, it is possible with the above-described language model learning method to build the language model of high reliability by updating the parameter of the language model according to the discriminative bases that are related to the bases that are used for the evaluation of the speech recognition. Therefore, highly accurate speech recognition can be achieved.

A language model learning program according to the present invention enables a computer to execute: recognition processing which performs speech recognition on learning speech data by using a language model stored in advance, and outputs a recognition result; reliability degree computing processing for computing reliability degrees of respective word strings in the recognition result; and language model parameter updating processing which updates a parameter of the language model based on the reliability degrees of the respective word strings. Further, the language model parameter updating processing may be specified to have contents for updating the parameter of the language model in such a manner that the reliability degrees of the respective word strings in the recognition result become the maximum.

Like the language model learning system, it is possible with the above-described language model learning program to build the language model of high reliability by enabling the computer to execute the language model parameter updating processing according to the discriminative bases that are related to the bases that are used for the evaluation of the speech recognition. Therefore, highly accurate speech recognition can be achieved.

With the present invention, learning of the language model is executed by updating the parameter of the language model according to the reliability degrees of each word string in the recognition result of the speech recognition, i.e., according to the discriminative bases that are related to the bases that are used for the evaluation of the speech recognition. Therefore, highly accurate speech recognition can be achieved.

DETAILED DESCRIPTION OF THE INVENTION

Hereinafter, the structure and operations of a language model learning system 10 as an exemplary embodiment of the invention will be described by referring to the accompanying drawings.

Figure 1:
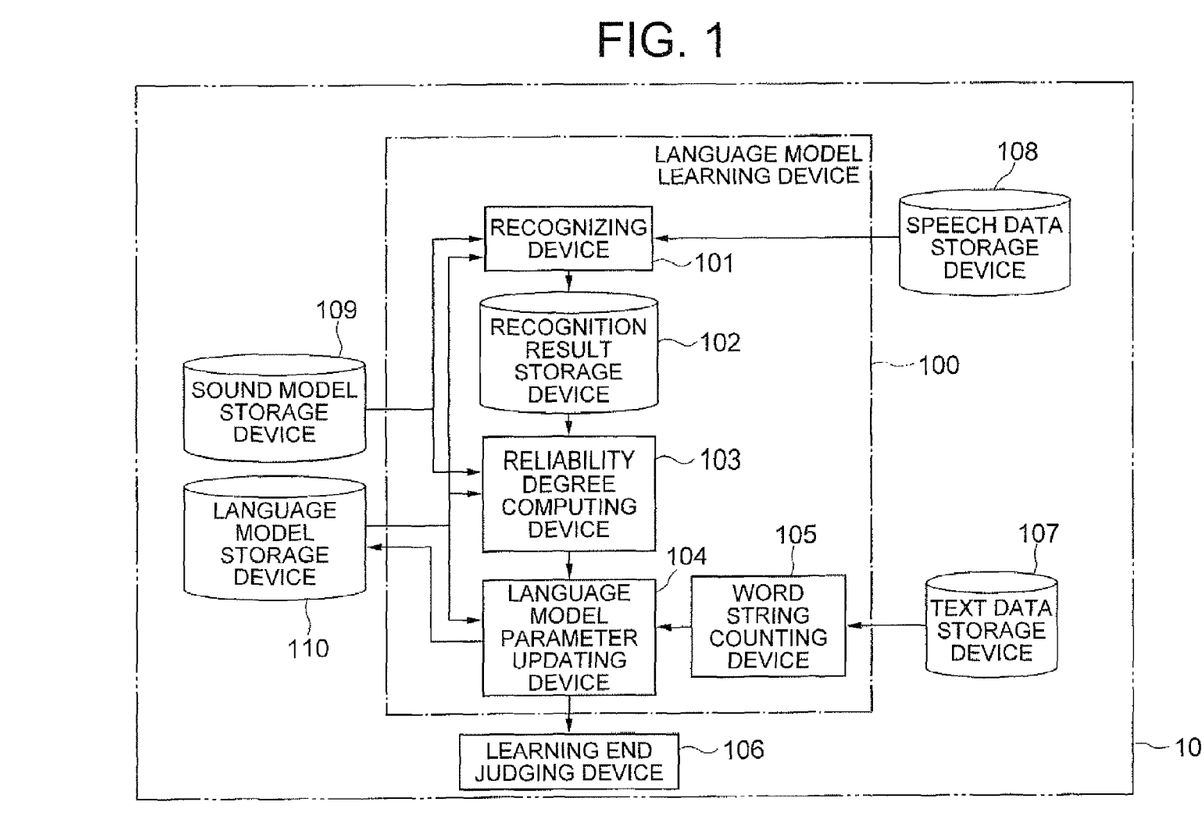
FIG. 1 is a block diagram showing a structure of a language model learning system as a first exemplary embodiment of the present invention.

FIG. 1 is a functional block diagram showing the structure of the language model learning system 10. The language model learning system 10 includes a language model learning device 100, a text data storage device 107, a sound model storage device 109, a language model storage device 110, and a learning end judging device 106.

The language model learning device 100 includes a recognizing device 101, a recognition result storage device 102, a reliability degree computing device 103, the sound model storage device 109, a language model parameter updating device 104, and a word string number counting device 105.

The text data storage device 107 stores learning text data for learning a language model, and a speech data storage part 108 stores learning speech data for leaning the language model. The text data stored in the text data storage device 107 is a script that is written based on the speech data stored in the speech data storage part 108 or, inversely, the speech data that is made by reading the text data aloud.

The learning speech data stored in the speech data storage part 108 is data that is obtained by A/D converting analog speech signals to 16-bits per sample with sampling frequency of 44.1 kHz, for example.

The sound model storage device 109 stores the sound model. This sound model is a probability model that expresses the sound characteristic of the speech by each phoneme. For example, it is HMM that is depicted in pp. 35-40 of "HTK book for HTK Version. 3.3 by Young, et al., (referred to as "Reference Document 1" hereinafter)" as a toolkit manual of HMM (Hidden Markov Model) issued at Cambridge University.

The language model storage part 110 stores the language model. This language model is the joint appearance probability obtained by considering the appearing order of the words. That is, it is the model where the degrees of linguistic linkable tendencies between a word and a word are put into numerical values. For example a language model configured with N-number of words is expressed as P (w[1], w[2], - - -, w[N]). This shows the appearance probability of a word string linked from the word w[1], to the word w[2], and then through the word w[N]. When this is expanded according to the Bays' rule, there is obtained P(w[1], w[2], - - -, w[N])=P(w[1])P(w[2]|w[1]) - - - P(w[N]|w[1], w[2] - - - w[N−1]). However, when "N" becomes too large, combinations of the word string w[1], w[2], - - - w[N−1] as a history of P(w[N]|w[1], w[2], - - - w[N−1]) becomes enormous, so that learning cannot be conducted. Therefore, in regular implementations, there are three or four words in the history. Such model is the N-gram model. In this exemplary embodiment, the N-gram model is used for the language model.

The recognizing device 101 uses the sound model stored in the sound model storage device 109 and the language model stored in the language model storage device 110 to perform speech recognition on the learning speech data stored that is in the speech data storage device 108, and outputs the recognition result.

The speech recognition processing executed by the recognizing device 101 can be classified roughly into a sound analysis and a search. The sound analysis is processing for computing the feature amount of the speech data. As depicted in pp. 55-66 of Reference Document 1, the speech recognition processing computes mel-cepstrum and the power, and the time change amount thereof by performing computations on the speech data regarding pre-emphasis, window function, FFT (Fast Fourier Transform), filter bank, making logarithms, and cosine transformation in this order. In the search, the sound likelihood of the words is computed by using the feature amount of the speech data and the sound model, and the word having the high sound likelihood is outputted as the recognition result. Further, there is also considered a case where scoring is also performed in the search by considering the language mode, in addition to the sound likelihood.

Figure 3A:
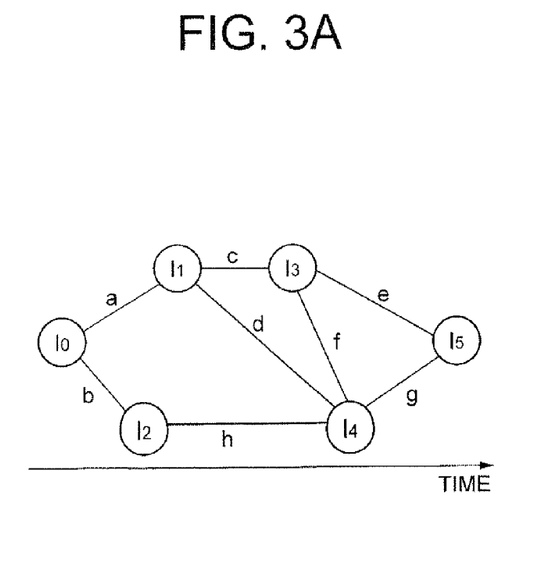
FIG. 3A and FIG. 3B are illustrations for describing an example of a word graph that is a recognition result outputted from a recognizing device disclosed in FIG. 1.
Figure 3B:
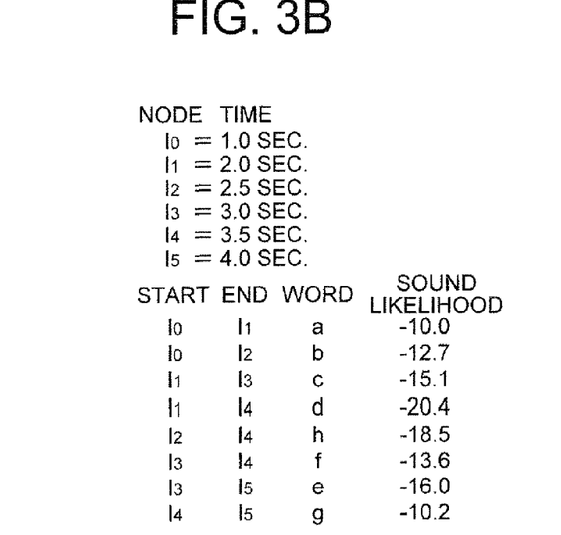

The output mode of the recognition result is in a word graph form as shown in FIG. 3. The word graph as shown in FIG. 3A is configured with nodes (I1-I5) illustrated with circles and arcs illustrated with lines like SLF (HTK Standard Lattice Format) depicted in pp. 333-337 of Reference Document 1.

Words are annexed to the arcs, which are shown as a-g in FIG. 3A. The word graph actually outputted from the recognizing device 101 is outputted as a text as in FIG. 3B including node time, start/end nodes and words of each ark, and the sound likelihood.

The recognition result storage device 102 stores the word graph that is the recognition result outputted from the recognizing device 101. The reliability degree computing device 103 computes the reliability degree that is a value showing whether or not a word string $\omega_j$ is recognized with respect to a speech observation time series $O_r$ based on the recognition result. When the sound model and the language model can both be built highly accurately, the reliability degree becomes closer to "1" for a correct word string, and becomes closer to "0" for an incorrect word string.

The word string counting device 105 extracts word strings from the text data stored in the text data storage device 107, and computes the number of appearance times for each kind of the word strings. For example, the word string counting device 105 computes how many times the word string "of the" in which "of" and "the" are linked appears within the learning text data.

The language model parameter updating device 104 updates the parameter of the language model by using Expression 1.

$$P_j = \frac{N_j - \sum_r p(\omega_j \mid O_r) + D p_j}{R - \sum_j \sum_r p(\omega_j \mid O_r) + D} \quad [\text{Expression 1}]$$

$\sum_r$ : Sum of learning speech data numbers $\sum_j$ : Sum of all word strings In Expression 1, $N_j$ indicates the appearing number of the word string cod in the learning text data, R indicates the total number of word strings having the same word number as $\omega_j$ contained in the learning text data, D is a constant, $p_j$ is the value of the language model before update, and $p(\omega_j|O_r)$ indicates the reliability degree of the word string $\omega_j$ when the speech observation time series $O_r$ is observed in the recognition result.

For $p(\omega_j|O_r)$ of Expression 1, it is possible to designate a parameter that shows the degree of contribution regarding the update of the language parameter. In that case, a parameter may be multiplied before $p(\omega_j|O_r)$, or the powers of the parameter may be used. Further, the constant D of Expression 1 can be determined to a value experimentally based on convergent state of estimated values.

Note here that word posteriori probability is the reliability computed from a statistical view point. The word posteriori can be computed by using a method that is depicted in "Frank Wessel, Ralf Schluter, Kalus Macherey, ans Herman Ney, "Confidence Measures for Large Vocabulary Continuous Speech Recognition," IEEE Trans. on Speech and Audio Processing. Vol 9, No. 3, March 2001 (referred to as "Reference Document 2" hereinafter).

Now, a method of computing the posteriori probability of a word c based on the recognition result shown in FIG. 3 according to Reference Document 2 will be described. In order to compute the posteriori probability of the word c based on the recognition result, it is necessary to obtain forward probability $\alpha$ and backward probability $\beta$ of the word c. Assuming that the language model is three-word chain probability (tri-gram model), the forward probability a can be expressed with Expression 2.

$$\alpha(a; c) = P_A(o_c \mid c) \sum_z \alpha(z; a) P_L(c \mid az) \quad \text{[Expression 2]}$$

All words starting at z∈a

Note here that $o_c$ is a feature amount of the word c, and it is expressed as O when showing the feature amount of the whole sections. $P_A(o_c|c)$ shows the sound likelihood of the word c, and $P_L(c|az)$ shows the appearance probability of the word string configured with the words z, a, and c in this order. As in Expression 2, the forward probability $\alpha$ of the word c is the sum of all the products of the forward probability of the words linked to the word a as a start and the language probability. When computing the forward probability of the word other than the word c, the forward probability of the target word can be computed by obtaining the forward probability of the word that appeared at the time earlier than the computation target word.

The backward probability $\beta$ is expressed with Expression 3.

$$\beta(c; e) = P_A(o_c \mid c) \sum_{z'} \beta(e; z') P_L(z' \mid ce) \quad \text{[Expression 3]}$$

All words connected to end of z'∈e

As in Expression 3, the backward probability $\beta$ of the word c has a reversed relation regarding the words c, e, z', and the like with respect to that of the forward probability $\alpha$ shown in Expression 2.

The posteriori probability $P(c|o_c)$ of the word c in the recognition result can be expressed with Expression 4 by using Expression 2 and Expression 3.

$$P(c \mid o_c) = \frac{\sum_z \sum_{z'} \alpha(z; c) \beta(c; z') P_L(z' \mid zc)}{P_A(O) P_A(o_c \mid c)} \quad \text{[Expression 4]}$$

All words starting at z∈a
All words connected to end of z'∈e

Note here that z of $\Sigma$ is the sum total of all the words connected to the start of the word a, and z' shows the sum total of all the words connected to the end of the word e. $P_A(O)$ is the sound likelihood of all the observation time series O, and it is expressed with Expression 5.

$$P_A(O) = \sum_z \sum_{z'} \alpha(z; z') \quad \text{[Expression 5]}$$

All words starting at z∈a
All words connected to end of z'∈e

By looking into the definition of the posteriori probability computing method, it can be seen that the posteriori probability is computed for each word. The posteriori probability $P(c|o_c)$ of the word c in the recognition result is the value showing what extent the word c matches the observation time series $O_c$ compared to the cases of the word d, h, or the like (see FIG. 3), and it is normalized to the values of 0-1. The posteriori probability of the word c can also be computed even when the word c is configured with two words.

In Expression 2, Expression 3, and Expression 4, it is possible to set the parameter that shows the degree of contribution of the sound model and the language model. In that case, the power of the parameter such as $P_A(o_c|c)^y$ or $P_L(c|az)^x$ is set.

Provided that $p(\omega_j|O_r)$ is the posteriori probability of the word string $\omega_j$ based on the recognition result, Expression 1 is obtained from the basis for estimating the parameter with which the posteriori probability of the word string becomes the maximum with respect to the speech recognition after learning. This basis is also used for the discriminative estimating method of the sound model. Learning of the sound model will be described in a second exemplary embodiment.

When updating the parameter of the language model by using Expression 1, $p(\omega_j|O_r)$ is the posteriori probability of the word string $\omega_j$ for the observation time series $O_r$. Expression 1 is in a form which subtracts the sum total of the reliability degrees in the recognition result from the appearance frequency of the word string $\omega_j$ in the learning text data. In a case of a word string whose reliability degree is high overall, the number subtracted from the appearance frequency becomes large. Thus, the parameter of the language model after being updated becomes small. Further, in a case of a word string with low reliability degree, the number subtracted from the appearance frequency becomes small. Thus, the parameter of the language model after being updated becomes large. Note here that "having high reliability degree" is a case where the reliability degree is "1", and "having low reliability degree" is a case where the reliability is other than "1".

When the posteriori probability is used for the reliability degree, update of the parameter of the language model is to depend on the recognition performance of the recognizing device 101.

Further, while the parameter of the language model is updated by using the posteriori probability for the reliability degree in this exemplary embodiment, any kinds of those may be used as long as those are the scales that satisfy the aforementioned characteristics. For example, a signal-to-noise ratio (SNR) of the speech signal of each word string, a ratio of continuous time of a word string to expected continuous time, etc. may be used as the reliability degree.

Further, the signal-to-noise ratio (SNR) of the speech signal of each word string, a ratio of continuous time of a word string to expected continuous time, and the posteriori probability of the target word string based on the recognition result may be combined to be used as the reliability degree. For example, each $p(\omega_j|O_r)$ of the denominator and numerator on the right side of Expression 1 may be replaced with $p'(\omega_j|O_r)$ that is computed from Expression 6 in the following.

$$p'(\omega_j|O_r) = Ap(\omega_j|O_r) + B(\text{SNR}) + C(\text{ratio of continuous time to expected continuous time}) \quad \text{[Expression 6]}$$

A, B, C are coefficients

The learning end judging device 106 computes the posteriori probabilities of all the speech data after update of the language model, and takes the sum "SUM [t]". Thereafter, a value obtained by subtracting the sum total "SUM[t−1]" of the word posteriori probabilities before updating the language model from "SUM[t]" is divided by "SUM[t]". This value is taken as a learning progress coefficient $T_p$. When the learning progress coefficient $T_p$ exceeds a threshold value set in advance, learning of the language model is conducted again. When the learning progress coefficient $T_p$ is below the threshold value, learning of the language model is ended.

Figure 2:
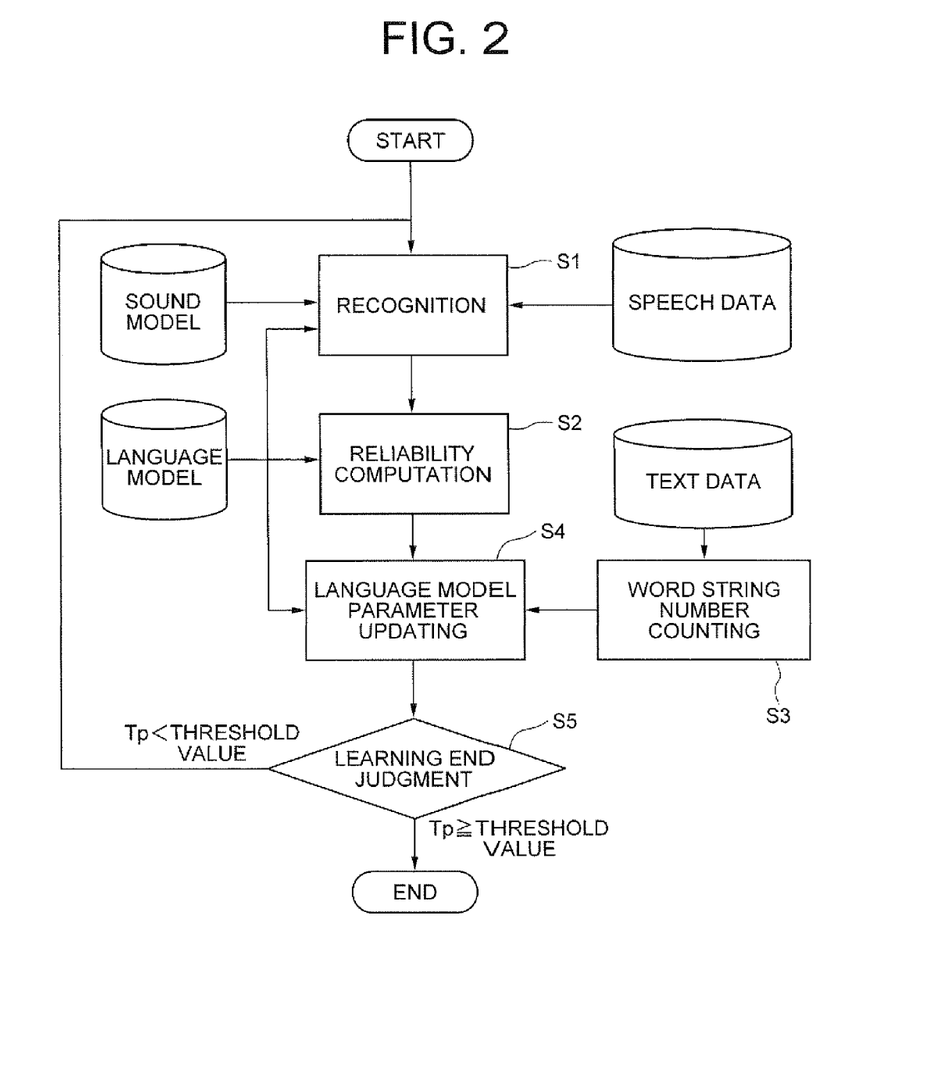
FIG. 2 is a flowchart showing operations of the language model learning system disclosed in FIG. 1.

FIG. 2 is a flowchart showing operations of the language model learning system 10.

In step 1, the recognizing device 101 performs speech recognition on the learning speech data stored in the speech data storage device 108 by using the sound model stored in the sound model storage device 109 and the language model stored in the language model storage device 110, and outputs the recognition result to the recognition result storage device 102. Regarding the sound model and the language model used herein, the parameter values thereof may be learned by any learning methods as long as those are of the aforementioned forms. Further, those may thoroughly be random numbers. The outputted recognition result is a word graph.

In step 2, the reliability degree computing device 103 computes the posteriori probabilities of each word string by using the recognition result stored in the recognition result storage device 102 and the language model stored in the language model storage device 110. This computing operation is conducted on all the recognition results obtained by the recognizing device 101.

In step 3, the word string number counting device 105 counts the number of word strings to be the targets from the learning text data stored in the text data storage device.

In step 4, the language model parameter updating device 104 updates the probability value of the language model by computing it through substituting the posteriori probability of the word string computed by the reliability degree computing device 103 and the numerical value counted by the word string number counting device 105 to Expression 1. The language model updated herein is a model that can be used to perform speech recognition.

In step S5, the learning end judging device 106 computes the word posteriori probability for all the learning data by using the parameter of the language model updated by the language model parameter updating device 104. Based thereupon, when the learning progress coefficient $T_p$ is below the threshold value, the operation of the language model learning system 10 is ended. When the learning progress coefficient $T_p$ exceeds the threshold, the operation is returned to Step 1.

With such language model learning system 10, the language model parameter updating device 104 updates the parameter of the language model based on the reliability degree of the word string in the recognition result, i.e., based on the discriminative bases related to the bases that are used for the evaluation of the speech recognition so as to execute learning of the language model. Therefore, it is possible to build the language model for enabling highly accurate speech recognition.

Next, a language model learning system 20 as a second exemplary embodiment of the invention will be described in detail by referring to the accompanying drawings. Since many of the constituents of the language model learning system 20 are in common to those of the language model learning system 10 shown in FIG. 1, explanations of the common structural elements are omitted by applying the same reference numerals as those of FIG. 1.

Figure 4:
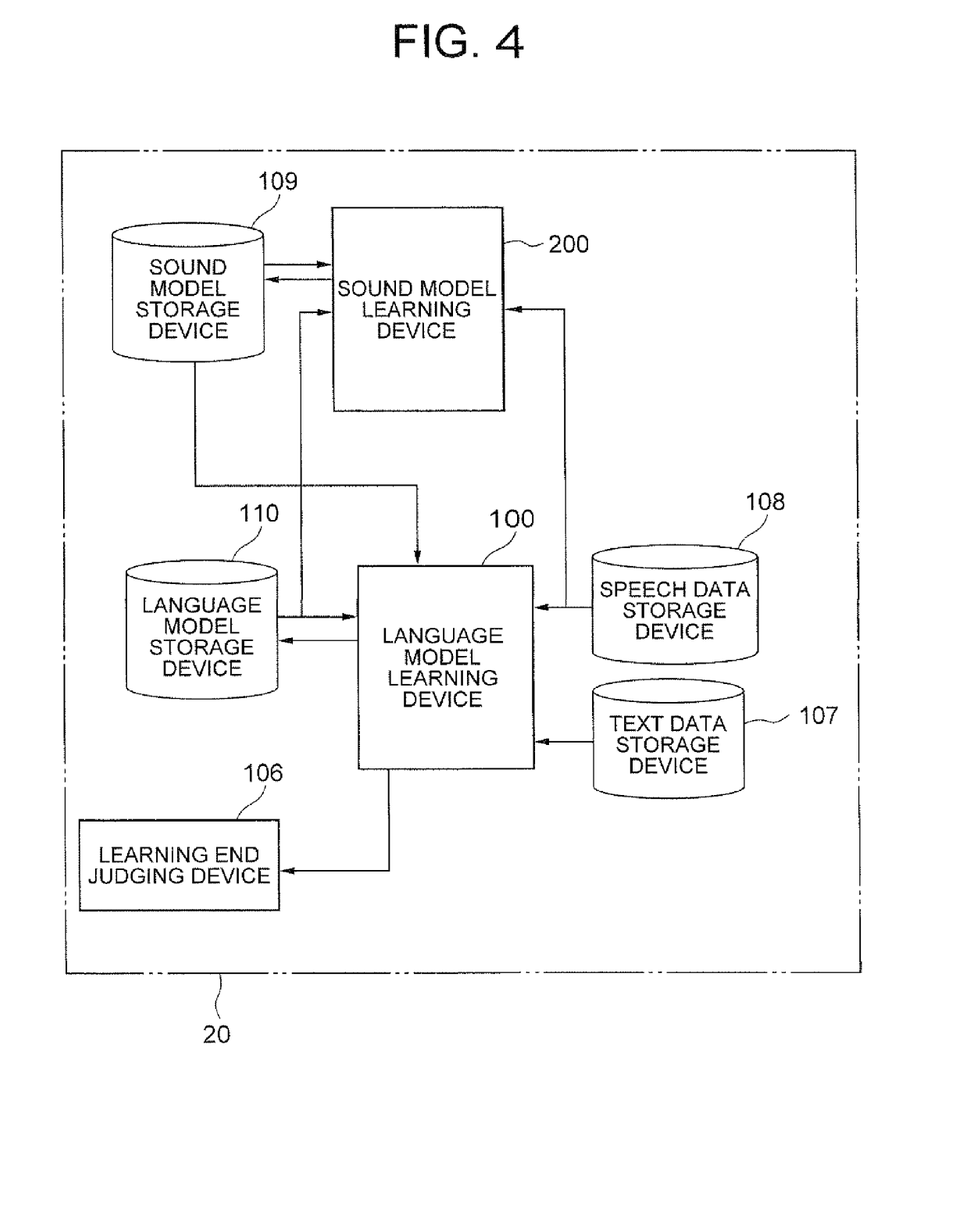
FIG. 4 is a block diagram showing a structure of a language model learning system as a second exemplary embodiment of the invention.

FIG. 4 is a functional block diagram showing the structure of the language model learning system 20. In addition to the constituents of the language model learning system 10 disclosed in FIG. 1, the language model learning system 20 contains a sound model learning device 200. The sound model learning device 200 performs learning of the sound model by using the learning speech data stored in the speech data storage device 108, the sound model stored in the sound model storage device 109, and the language model stored in the language model storage device 110.

As a learning method of the sound model executed by the sound model learning device 200, there is used estimation based on mutual information amount bases as depicted in "MMIE training of large vocabulary recognition systems" Speech Communication vol. 22, pp. 303-314, 1997, V. Veltchev, J. J Odell, P. C. Woodland, S. J. Yang (referred to as "Reference Document 3" hereinafter). Learning of the sound model based on the mutual information amount bases will be described according to pp. 308-309 of Reference Document 3.

First, the sound model learning device 200 performs speech recognition on the learning speech data stored in the speech data storage device 108 by using the sound model and the language model. This recognition result is outputted in a word graph, and the posteriori probability of each word string based on the recognition result is computed. It is necessary to compute segmentations of phonemes and conditions within the word. Those are computed by Viterbi algorithm. After computing the segmentation of the phonemes, a sufficient statistic amount for each condition is computed. It is necessary to compute the posteriori probability by each phoneme and condition when computing the sufficient statistic amount. The posteriori probability of the word is used in Reference Document 3. Computation of the sufficient statistic amount is executed not only for the recognition result but also for the correct character string in the same manner. The parameter of the sound model is updated by applying the recognition result and the sufficient statistic amount for the recognition result into Expression (4) as well as Expression (5) depicted in p. 305 of Reference Document 3 and into Expression (8) depicted in p. 306.

Figure 5:
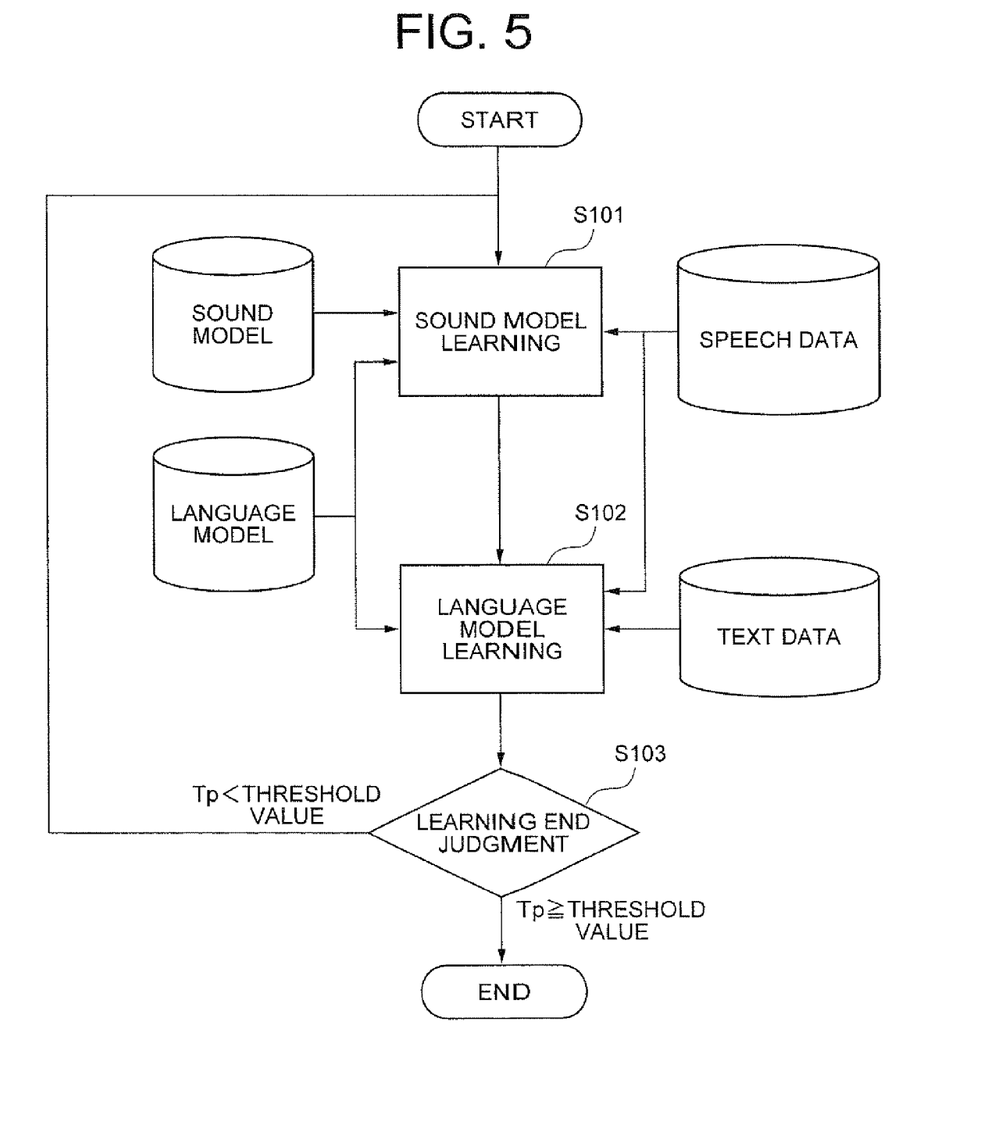
FIG. 5 is a flowchart showing operations of the language model learning system disclosed in FIG. 4.

FIG. 5 is a flowchart showing operations of the language model learning system 20.

In Step 101, the sound model learning device 200 executes learning of the sound model by using the sound model stored in the sound model storage device 109, the language model stored in the language model storage device 110, and the speech data stored in the speech data storage device 108. For the learning of the sound model, there is also considered a method based on a likelihood standard by Baum=Welch algorithm that is depicted in pp. 6-8 of Reference Document 2, other than the above-described learning that uses the mutual information amount. After learning the sound model, the sound model stored in the sound model storage device 109 is updated. Thereafter, the operation is shifted to the processing of Step 102.

In Step 102, the parameter of the language model is updated in the same manner as that of the first exemplary embodiment by using the sound model updated in Step 101, the learning speech data stored in the speech data storage device 108, and the learning text data stored in the text data storage device 107.

In Step 103, as in the case of the first exemplary embodiment, the learning end judging device 106 subtracts the sum total "SUM[t−1]" before update from the sum total "SUM[t]" of the posteriori probabilities of each word string based on the recognition result after the update of the language model, divides the obtained value by "SUM[t]", and takes it as the learning progress coefficient $T_p$. When the learning progress coefficient $T_p$ exceeds a threshold value set in advance, learning is conducted again from step 101. When the learning progress coefficient $T_p$ is below the threshold value, learning of the language model is ended.

The difference between "SUM[t]" of the first exemplary embodiment and "SUM[t]" of the second exemplary embodiment is that the sound model in the first exemplary embodiment is not updated while the sound model in the second exemplary embodiment is updated. Note that Expression (4), Expression (5) depicted in p. 305 of Reference Document 3 and Expression (8) depicted in p. 306 are derived from an expression that is same as Expression 1 described above.

As described above, the language model learning system 20 according to the second exemplary embodiment contains the sound model learning device 200, and learns the sound model and the language model with the standardized discriminative bases. Therefore, it is possible to optimize both the sound model and the language model simultaneously, thereby making it possible to build the sound model and the language model for enabling highly accurate speech recognition.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

REFERENCE NUMERALS 10, 20 Language model learning system
100 Language model learning device
101 Recognizing device
102 Recognition result storage device
103 Reliability degree computing device
104 Language model parameter updating device
105 Word string number counting device
106 Learning end judging device
107 Text data storage device
108 Speech data storage device
109 Sound model storage device
110 Language model storage device
200 Sound model learning device

The invention claimed is:

1. A language model learning system, comprising:
a language model storage device for storing a language model used for speech recognition;
a recognizing device which performs speech recognition on learning speech data stored in advance by using the language model stored in the language model storage device, and outputs a recognition result;
a reliability degree computing device for computing reliability degrees of respective word strings in the recognition result;
a language model parameter updating device which updates a parameter of the language model stored in the language model storage device based on the reliability degrees of the respective word strings computed by the reliability degree computing device; and
a word string number counting device which computes a number of all the word strings within the learning text data corresponding to the learning speech data and computes appearing number of the respective word strings,
wherein the reliability degree computing device computes posteriori probability of the respective word strings based on the recognition result as the reliability degrees of the corresponding word strings,
the posteriori probability of the respective word strings are obtained from forward probability and backward probability that relate to an order of appearance of words computed based on the recognition result,
the language model parameter updating device computes appearance frequencies of the respective words from the number of all the word strings computed by the word string number counting device and the appearing number of the respective word strings, and updates the parameter of the language model stored in the language model storage device based on the appearance frequencies of the respective word strings and the reliability degrees of the respective word strings computed by the reliability degree computing device, and
provided that the appearing number of the word string $\omega_j$ in the learning text data is $N_j$, a total number of word strings having the same word number as $\omega_j$ contained in the learning text data is R, the reliability degree of the word string $\omega_j$ when observation time series $O_r$ is observed in the recognition result is $p(\omega_j|O_r)$, a constant is D, and the value of the language model before update is $p_j$, the language model parameter updating device computes parameter $p_j$ of the language model corresponding to the word string $\omega_j$ according to Expression 1 and updates the parameter to a computed value $$P_j = \frac{N_j - \sum_r p(\omega_j \mid O_r) + Dp_j}{R - \sum_j \sum_r p(\omega_j \mid O_r) + D} \qquad \text{[Expression 1]}$$

$\sum_r$: Sum of learning speech data numbers $\sum_j$: Sum of all word strings.

2. The language model learning system as claimed in claim 1, further comprising:
a sound model storage device for storing a sound model used for speech recognition; and
a sound model learning device which updates the sound model stored in the sound model storage device based on the sound model, the learning speech data, and the language model stored in the language model storage device.

3. The language model learning system as claimed in claim 2, wherein the sound model learning device updates the sound model stored in the sound model storage device by using a mutual information amount basis.

4. A language model learning method, comprising:
performing speech recognition on learning speech data by using a language model stored in advance, and outputting a recognition result;
computing reliability degrees, using a processor, of respective word strings in the recognition result; and
updating a parameter of the language model based on the reliability degrees of the respective word strings in the recognition result,
wherein at computing reliability degrees of respective word strings, posteriori probability of the respective word strings based on the recognition result is computed as the reliability degrees of the corresponding word strings, the posteriori probability of the respective word strings are obtained from forward probability and backward probability that relate to an order of appearance of words computed based on the recognition result, at updating the parameter of the language model, the parameter of the language model is updated based on appearance frequencies of the respective word strings within the learning text data that corresponds to the learning speech data and the reliability degrees of the respective word strings computed at computing reliability degrees of respective word strings, and provided that the appearing number of the word string w- in the learning text data is $N_j$, a total number of word strings having the same word number as $\omega_j$ contained in the learning text data is R, the reliability degree of the word string $\omega_j$ when observation time series $O_r$ is observed in the recognition result is $p(\omega_j|O_r)$, a constant is D, and the value of the language model before update is $p_j$, the language model parameter updating device computes parameter $p_j$ of the language model corresponding to the word string $\omega_j$ according to Expression 1 and updates the parameter to a computed value $$P_j = \frac{N_j - \sum_r p(\omega_j \mid O_r) + Dp_j}{R - \sum_j \sum_r p(\omega_j \mid O_r) + D}$$ [Expression 1]

$\sum_r$ : Sum of learning speech data numbers $\sum_j$ : Sum of all word strings.

5. The language model learning method as claimed in claim 4, comprising using a sound model stored in advance, the language model, and the learning speech data to update the sound model.

6. The language model learning method as claimed in claim 5, wherein, at using the sound model stored in advance, the language model, and the learning speech data to update the sound model, the sound model is updated by using a mutual information amount basis.

7. A tangible or non-transitory computer readable recording medium storing a language model learning program for enabling a computer to execute:
recognition processing which performs speech recognition on learning speech data by using a language model stored in advance, and outputs a recognition result;
reliability degree computing processing for computing reliability degrees of respective word strings in the recognition result; and
language model parameter updating processing which updates a parameter of the language model based on the reliability degrees of the respective word strings in the recognition result, wherein the reliability degree computing processing is specified to have contents for computing posteriori probability of the respective word strings based on the recognition result as the reliability degrees of the corresponding word strings, the posteriori probability of the respective word strings are obtained from forward probability and backward probability that relate to an order of appearance of words computed based on the recognition result, the language model parameter updating processing is specified to have contents for updating the parameter of the language model based on appearance frequencies of the respective word strings within the learning text data that corresponds to the learning speech data and the reliability degrees of the respective word strings computed by the reliability degree computing step, and provided that the appearing number of the word string $\omega_j$ in the learning text data is $N_j$, a total number of word strings having the same word number as $\omega_j$ contained in the learning text data is R, the reliability degree of the word string $\omega_j$ when observation time series $O_r$ is observed in the recognition result is $p(\omega_j|O_r)$, a constant is D, and the value of the language model before update is $p_j$, the language model parameter updating processing is specified to have contents for computing the parameter $p_j$ of the language model corresponding to the word string $\omega_j$ according to Expression 1 and updating the parameter to a computed value [Expression 1]

$$P_j = \frac{N_j - \sum_r p(\omega_j \mid O_r) + Dp_j}{R - \sum_j \sum_r p(\omega_j \mid O_r) + D}$$ [Expression 1]

$\sum_r$ : Sum of learning speech data numbers $\sum_j$ : Sum of all word strings.

8. The tangible or non-transitory computer readable recording medium storing the language model learning program as claimed in claim 7, which enables the computer to execute sound model learning processing for updating a sound model based on the sound model stored in advance, the language model, and the learning speech data.

9. The tangible or non-transitory computer readable recording medium storing the language model learning program as claimed in claim 8, wherein the sound model learning processing is specified to have contents for updating the sound model by using a mutual information amount basis.

* * * * *